United States Patent
Lu et al.

(10) Patent No.: US 10,338,526 B2
(45) Date of Patent: Jul. 2, 2019

(54) DEVICES AND METHODS FOR HOLOGRAPHIC 3D IMAGING

(71) Applicant: The Chinese University of Hong Kong, Hong Kong (CN)

(72) Inventors: Yujie Lu, Changzhou (CN); Yunhui Liu, Hong Kong (CN)

(73) Assignee: THE CHINESE UNIVERSITY OF HONG KONG, Hong Kong (CN)

( * ) Notice: Subject to any disclaimer, the term of this patent is extended or adjusted under 35 U.S.C. 154(b) by 305 days.

(21) Appl. No.: 15/171,302

(22) Filed: Jun. 2, 2016

(65) Prior Publication Data

US 2017/0017202 A1 Jan. 19, 2017

Related U.S. Application Data

(60) Provisional application No. 62/194,060, filed on Jul. 17, 2015.

(51) Int. Cl.
*G03H 1/04* (2006.01)

(52) U.S. Cl.
CPC ......... *G03H 1/0402* (2013.01); *G03H 1/0443* (2013.01); *G03H 2001/0445* (2013.01); *G03H 2210/56* (2013.01); *G03H 2223/12* (2013.01)

(58) Field of Classification Search
None
See application file for complete search history.

(56) References Cited

U.S. PATENT DOCUMENTS

| | | | | |
|---|---|---|---|---|
| 3,803,720 A * | 4/1974 | Helava | ................... | G01C 11/00 33/227 |
| 5,126,862 A * | 6/1992 | Hong | ................... | G03H 1/00 359/24 |
| 5,504,596 A * | 4/1996 | Goto | ................... | G03F 7/70558 356/401 |
| 2003/0011881 A1* | 1/2003 | Sure | ................... | G02B 21/0032 359/388 |
| 2005/0254108 A1* | 11/2005 | Chuang | ................... | G03H 1/20 359/21 |

OTHER PUBLICATIONS

Lu et al., An ultra-compact multiplexed holographic microscope using a multiple-pinhole aperture, Optics Express, Oct. 2, 2015, vol. 23, No. 20, pp. 26779-26793.
Lu et al., Simple, portable, and low-cost microscope based on off-axis digital holography using two spherical waves, Optics Letters, Jul. 29, 2014, vol. 39, No. 15, p. 4549-4552.

* cited by examiner

*Primary Examiner* — Jennifer D. Carruth
(74) *Attorney, Agent, or Firm* — Knobbe, Martens, Olson & Bear LLP

(57) ABSTRACT

A device, system and method for holographic 3D imaging. The device includes a laser light source that delivers a laser beam; an aperture disc including at least two pinholes, the laser beam being filtered by the pinholes so that a reference wave and an object wave are generated; a sample having a first area containing an object to be imaged and a second area without any object, in which the first area and the second area are illuminated by the object wave and the reference wave respectively; and an image sensor that captures an off-axis hologram for reconstructing an image of the object, in which the reference wave and the object wave are interfered on the image sensor and the hologram is captured based on an interference pattern of the reference wave and the object wave.

17 Claims, 4 Drawing Sheets

DEVICES AND METHODS FOR HOLOGRAPHIC 3D IMAGING

RELATED APPLICATIONS

This application claims priority to U.S. Provisional Application No. 62/194,060, filed Jul. 17, 2015, the entire contents of which are incorporated herein by reference.

TECHNICAL FIELD

This application relates to holographic 3D imaging.

BACKGROUND

At present, there are two kinds of techniques for holographic 3D imaging, i.e., inline holography and off-axis holography. Inline holographic devices usually have serious twin image noise, while off-axis holographic devices comprise a lot of optical components.

SUMMARY

According to an aspect of the application, disclosed is a device, comprising: a laser light source that delivers a laser beam; an aperture disc comprising at least two pinholes, the laser beam being filtered by the pinholes so that a reference wave and an object wave are generated; a sample having a first area containing an object to be imaged and a second area without any object, wherein the first area and the second area are illuminated by the object wave and the reference wave respectively; and an image sensor that captures an off-axis hologram for reconstructing an image of the object, wherein the reference wave and the object wave are interfered on the image sensor and the hologram is captured based on an interference pattern of the reference wave and the object wave.

According to another aspect of the application, disclosed is a system, comprising: the above device; and a processor that receives the captured hologram from the image sensor and reconstructs an image of the object according to the received hologram.

According to a further aspect of the application, disclosed is a method, comprising: delivering a laser beam on an aperture disc comprising at least two pinholes; filtering the beam by the pinholes into a first wave and a second wave; leading the first and second waves to a first area containing an object and a second area without any object, respectively; capturing an off-axis hologram based on an interference pattern of the reference wave and the object wave; and reconstructing an image of the object according to the hologram.

DRAWINGS

DETAILED DESCRIPTION

Figure 1:
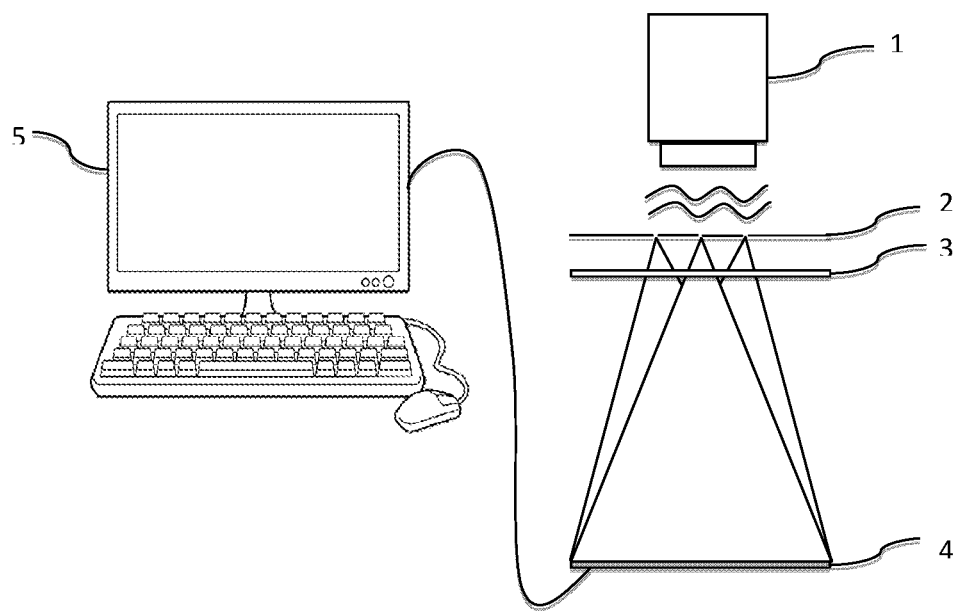
FIG. 1 is a schematic representation of a system for holographic 3D imaging according to an embodiment of the application.

According to an embodiment of the present application, as illustrated in FIG. 1, a system for holographic 3D imaging comprises a laser light source 1, an aperture disc 2, a sample 3, an image sensor 4, and a processor 5. The laser light source 1 delivers a laser beam. The aperture disc 2 comprises at least two pinholes.

The laser beam is filtered by the pinholes so that a reference wave and an object wave are generated. For example, the pinholes may comprise a reference pinhole and an object pinhole. The light passing through the reference pinhole is a reference wave. The light passing through the object pinhole is an object wave. The sample 3 has an area containing an object to be imaged and an area (hereinafter referred as clean area) without any object. Both areas are illuminated by the object wave and the reference wave respectively. The reference wave and the object wave are interfered on the image sensor 4 and an off-axis hologram is captured by the image sensor 4 based on an interference pattern of the reference wave and the object wave. The off-axis hologram captured by the image sensor 4 may be a normal or multiplexed defocused off-axis hologram. The processor 5 reconstructs an image of the object according to the hologram received from the image sensor. The processor 5 may comprise a display device that displays the reconstructed image. The processor 5 may further comprise a graphics processing unit (GPU) or other image processing device.

According to an embodiment, the laser beam delivered from the laser light source 1 may be low-coherent or coherent, collimated or roughly collimated. The aperture disc 2, the sample 3, and the image sensor 4 are placed in a parallel manner, and the axis of the laser beam delivered from the laser light source 1 is perpendicular to those parallel components. The laser beam may be focused or roughly focused at the center of the imaging sensor 4. The laser beam may be in visible spectrum, infrared spectrum or ultraviolet spectrum. The laser beam may comprise a plurality of waves of different wavelengths. A laser diode with a small lens may act as the laser light source.

Figure 2:
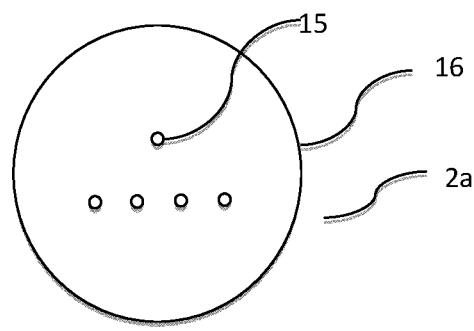
FIG. 2 is an aperture disc comprising a disc and five pinholes on said disc in an embodiment of the application.
Figure 3:
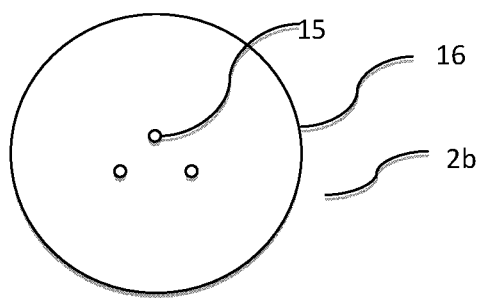
FIG. 3 is an aperture disc comprising a disc and three pinholes on said disc in an embodiment of the application.
Figure 4:
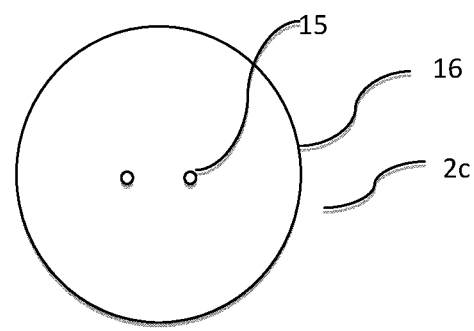
FIG. 4 is an aperture disc comprising a disc and two pinholes on said disc in an embodiment of the application.

According to an embodiment, all pinholes in the aperture disc 2 are illuminated by the laser beam simultaneously. The pinholes may have a diameter of 0.5 μm to 5 μm, with any specific pattern. FIGS. 2-4 illustrate aperture discs 2a, 2b, 2c comprising a disc 16 and five, three and two pinholes 15 respectively. In each of FIGS. 2-4, the pinholes comprise one reference pinhole and one or more object pinholes.

The sample 3 is placed normally close to the aperture disc 2 and the imaging sensor 4 is placed further. The distance $z_1$ between the aperture disc 2 and the sample 3 is smaller than the distance $z_2$ between the sample 3 and the imaging sensor 4. For example, the distance between the sample 3 and the imaging sensor 4 may be several times of the distance between the aperture disc 2 and the sample 3. The clean area is also free of other particles which will change the property of the light including amplitude and phase.

Figure 5:
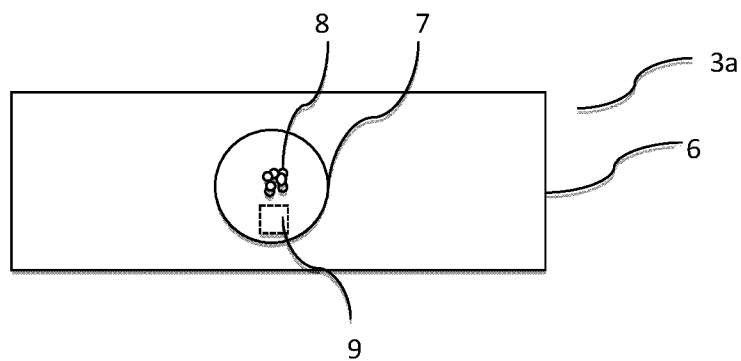
FIG. 5 illustrates a sample comprising one or more objects and an area without any objects.

FIG. 5 illustrates a sample 3a comprising one or more objects 8 and a clean area 9 without any objects. The sample 3a also includes a glass slide 6 and a cover slide 7. The objects 8 may be smeared onto the glass slide 6 and covered by the cover slide 7 to prevent it from being contaminated. The objects 8 and the clean area 9 are arranged according to the layout of the pinholes in the aperture disc 2 so that the light passing through the reference pinhole illuminates onto the clean area and the light passing through the object pinholes illuminates onto the objects. The glass slide is a holder for supporting the object, which may be implemented by other holder for supporting the object.

According to an embodiment, the reconstructed image is a three-dimensional image of the object. According to another embodiment, the reconstructed image is a phase profile of the object.

In one embodiment, the aperture disc is a multi-pinhole aperture disc. The multi-pinhole aperture disc emits multiple spherical waves. One of the spherical waves goes through said area. The other spherical waves illuminate on the objects. All the spherical waves are interferenced with each other at the image sensor and compose a multiplexed hologram. The processor retrieves the multiplexed hologram, reconstructs multiple images of different objects and displays the reconstructed two-dimensional or three-dimensional images on the display device in real time. The two-dimensional image may include a phase profile and an amplitude profile. The three-dimensional image may further include a height profile. The phase profile and the amplitude profile may be retrieved from the multiplexed hologram. While a refractive index of the sample is roughly the same, the phase profile may be also treated as the height of the sample after a simple scaling process.

In the embodiment, the ratio between the $z_1$ and $z_2$ equals to the ratio of the distance between the object pinholes and the side length of the image sensor. The laser light source 1 may have a power of about 120 mW with the wavelength of 650 nm. The laser light source 1 may comprise a holder and cooler, a laser diode, a lens, and a power supply. As shown in FIG. 2, the aperture disc 2a comprises a disc 16 and five pinholes 15. One pinhole 15 on the top of the aperture disc 2a is the reference pinhole while the other pinholes 15 are the object pinholes. The object pinholes distribute evenly in a line. The distance between the reference pinhole and the connection of the object pinholes is 1.5 times larger than the distance between object pinholes. The diameter of the pinholes limits the resolution of the system and the light intensity at the image sensor 4. The resolution increases with the decrease of the diameter of the pinholes. The light intensity increases with the increase of the diameter of the pinholes. Thus there is a trade-off between achieving a higher resolution and a brighter viewing field. The diameter of the pinholes may be in a range of 0.5 to 5 μm. The preferred diameter of the pinholes is 3 μm so that sufficient light can go through the aperture disc 2, and at the same time the resolution of the imaging device could achieve 1.5 μm. The projection of the imaging sensor 4 on the sample with respect to the object pinhole is the imaging area of the corresponding object pinhole. The different imaging areas are connected to each other to form a large bar-shape area. The projection of the imaging sensor 4 with respect to the reference pinhole is referred to as the reference window.

Figure 6:
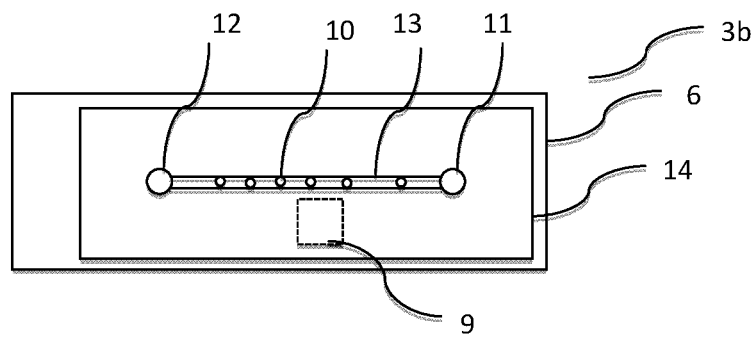
FIG. 6 illustrates a sample comprising one or more objects restricted to a specific support (micro-channel) and an area without any objects.

The reference window should be located within the clean area 9 that without any objects. This may be difficult to guarantee if the user wants to move the sample 3 to image different objects 8. According to an embodiment, it is preferred that the sample containing the object can move within a specific support. For example, a sample 3b with a support in the form of a micro-channel with fluidic biological objects is shown in FIG. 6. Referring to FIG. 6, the sample 3b may comprise a glass slide 6 and a Polydimethylsiloxane (PDMS) 14. The PDMS 14 may include a micro-channel 13 with an inlet 11 and an outlet 12. The fluidic objects 10 are pumped into the micro-channel 13 from the inlet 11 to the outlet 12. The PDMS 14 may be regarded as a roof on the glass slide 6, with a micro-channel on a surface facing the glass slide 6. The imaging areas could be disposed along the micro-channel 13 so that the imaging device can reconstruct the 3D structure of all fluidic objects 10 flowing through the micro-channel 13. The clean area 9 is also comprised. For example, the resolution of the imaging sensor 4 is 2048*2048 with a pixel size of 5.5 μm. A computer acts as the processor 5 may comprise one or more Graphic Processing Units which can speed up the reconstruction process. The processing rate of the system can reach over 200 Hz.

In operation, the laser light source 1 illuminates all the pinholes 15 on the aperture disc 2. The laser beam is then filtered into multiple spherical waves. One of those spherical waves, which is referred to as reference wave, is arranged to go through an area 9 without any objects. Other spherical waves, which are referred to as object waves, illuminate the objects. The illuminated areas of the object wave, namely the imaging areas, are connected to each other, and have no overlapping with the illuminated area of the reference wave which is the reference window aforementioned. This is achieved by carefully dispose the sample. All the spherical waves are then combined and produce an interference pattern on the imaging sensor 4. The interference pattern is then captured by the imaging sensor 4 and is transformed into a multiplexed hologram. This hologram may be then transmitted to the processor 5. As will be described in detail later, the processor reconstructs the amplitude and phase profiles of the imaging areas one by one and displays the 3D structure of the sample on the displaying device. The reconstruction may be obtained from the hologram and a background hologram obtained without a sample (including an object and an object holder). The reconstruction may be obtained from the hologram and a background hologram obtained with a sample without the object. The reconstruction may be based on conventional methods and thus is omitted here.

In another embodiment, the aperture disc 2 is a dual-pinhole aperture disc. The laser beam is casted on an aperture disc covering both pinholes on the aperture disc. The aperture disc filters the laser beam and emits two spherical waves. One of the spherical waves goes through the clean area. The other spherical wave illuminates the area including the object. In particular, the other spherical wave illuminates the object. The two spherical waves interference at the image sensor 4 and compose a hologram. The processor 5 retrieves the hologram captured by the image sensor 4, carries out the reconstruction of the object and displays the reconstructed two-dimensional or three-dimensional images on a display device in real time.

An aperture disc 2c, which comprises a disc 16 and two pinholes 15 on the disc 16, is illustrated in FIG. 4. The disc 16 may be a metal disc. Either of those pinholes may act as a reference pinhole. The other pinhole is referred to as an object pinhole. The ratio between the $z_1$ and $z_2$ is about 1.5 times larger than previous embodiment with five holes. And only one quadrate imaging area can be retrieved. As a result, the computational load is lower and the image quality is a little bit better with the trade off of imaging area. According to this embodiment, the imaging area is about 2.5 times smaller.

In the embodiment, the laser beam is filtered into to two spherical waves. Either of the spherical waves could act as the reference wave as long as it goes through the area without any objects. The two spherical waves combine with each other and generate a normal off-axis hologram that is then transmitted to the processor 5. The processor reconstructs the amplitude and phase profiles of the imaging area and displays the 3D structure of the sample on the displaying device.

The reconstruction may be based on conventional methods. For example, the reconstruction begins with the capture of the hologram which can be represented as $$I = |r(x,y)|^2 + \sum_{i=1}^{N} |b_i(x,y)|^2 + r^*(x,y)b_1(x,y) + \ldots + \\ r^*(x,y)b_N(x,y) + r(x,y)b_1^*(x,y) + \ldots + r(x,y)b_N^*(x,y) + \\ b_1(x,y)b_2^*(x,y) + \ldots + b_{N-1}(x,y)b_N^*(x,y) + \\ b_1^*(x,y)b_2(x,y) + \ldots + b_{N-1}^*(x,y)b_N(x,y),$$ (1)

where $r(x,y)$ is the reference wave, $b_i(x,y)$ represent(s) the object wave(s), * denotes the conjugate operator and N represents the number of the object waves (for example, $N \in \{1, 4\}$).

Below, an object term $r^*(x,y)b_1(x,y)$ is considered.

$$r^*(x,y)b_1(x,y) \approx |r(x,y)|b_1'(x,y)\exp(ik(s_{O1} - s_{R1})) \\ \approx C|r(x,y)|b_1'(x,y)\exp\left(\frac{ik}{Z}(d_x x - d_y y)\right)$$ (2)

where $b_1'(x,y) = b_1(x,y) \exp(-iks_{O1})$, k is the wave number, $s_{O1}$ is the distance between the pixels on the imaging sensor and the object pinhole, $s_{R1}$ is the distance between the pixels on the imaging sensor and the reference pinhole, C is a complex constant, $Z=z_1+z_2$, $d_x$ is distance between the object pinhole and the reference pinhole along x direction of the imaging sensor and $d_y$ is distance between the object pinhole and the reference pinhole along y direction of the imaging sensor. From this equation, it can be seen that the object term(s) is(are) modulated to higher frequency part, and the shifted frequency $$\vec{f_{sh}} \approx \left(\frac{d_x}{Z\lambda}, \frac{d_y}{Z\lambda}\right).$$ (3)

Thus the spatial filtering method can be adopted to filter each object term out. The enlarged object then can be reconstructed from the filtered object term using the following equation.

$$\text{object}\left(\frac{x}{M}, \frac{y}{M}\right) = \frac{r^*(x,y)b_1(x,y)}{|r(x,y)|\exp(ik(s_{O1} - s_{R1}))} ** h_{M*z_2}(x,y)$$ (4)

In Eq. (4), $$M = \frac{z}{z_1}$$

is the magnification factor of the system, ** denotes the convolution operator and $h_z$ represents the Fresnel kernel which is defined by $$h_z(x,y) = \exp\left(i\frac{\pi}{\lambda z}(x^2 + y^2)\right),$$ (5)

where $\lambda$ is the wavelength of the laser light source. The term $|r(x,y)|\exp(ik(s_{O1}-s_{R1}))$ can be calculated from a background hologram (a hologram captured without objects).

Once the complex profile of the object is generated, the unwrapped phase can be exacted which represents the optical delay of the transmissive light. If the refractive index is homogeneous inside the sample, the phase profile can reflex the 3D structure of the sample. And that's the end of the 3D reconstruction of an object term. In embodiment with multiple pinholes, the object terms should be reconstructed one by one before displaying them on the display device.

Figure 7:
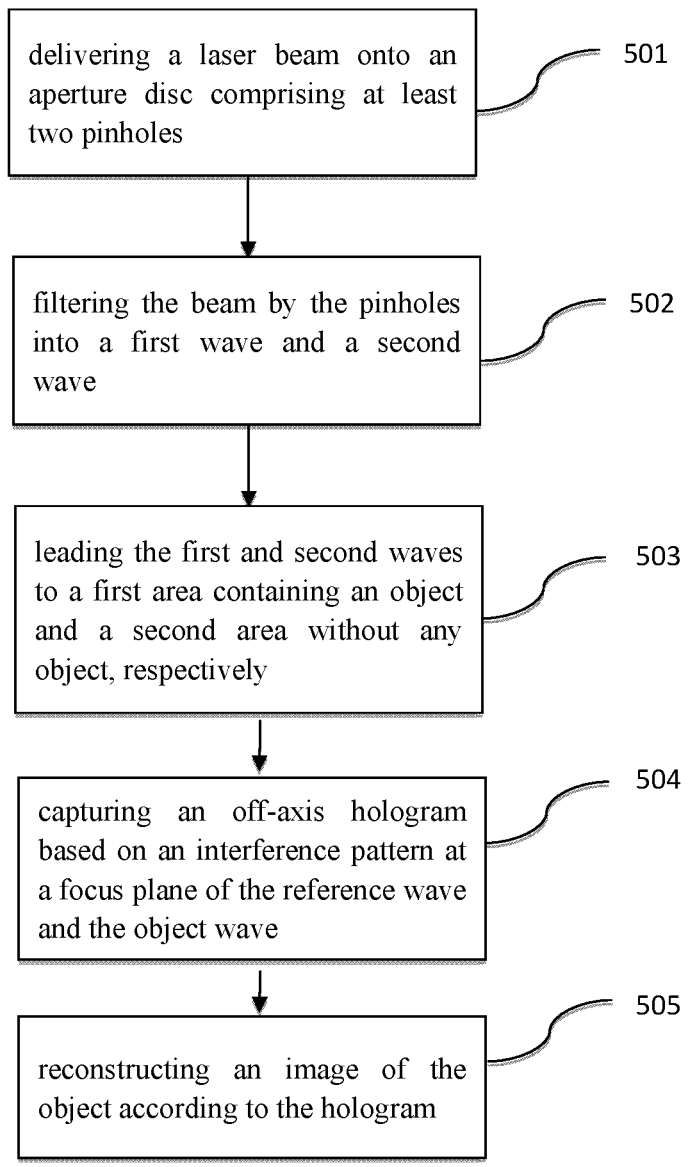
FIG. 7 is a flow chart of a method for holographic 3D imaging according to an embodiment of the application.

According to an embodiment, a method for holographic 3D imaging is provided. A flowchart of the method is shown in FIG. 7. The method begins at step 501 where a light beam is delivered by the laser light source to an aperture disc comprising at least two pinholes. The beam casts a light spot on the aperture disc and covers all the pinholes on that aperture disc. The beam is filtered and split into different spherical waves at the step 502, including a first wave and a second wave. At step 503, different optical path is introduced for different spherical waves so that the first and second waves are led to a first area containing an object and a second area without any object, respectively. The combined waves form an interference pattern which is captured by the imaging sensor at step 504. At the final step 505, an image of the object is reconstructed according to the hologram.

All the description of the device and system described above is applicable to the corresponding method.

According to embodiments of the present application, except for the lens within the laser light source, no lenses, beam splitters, mirrors or prisms is used, which makes the device of the present application compact as Gabor in-line holographic microscope but with no twin image noise.

Although the preferred embodiments of the present invention have been described, many modifications and changes may be possible once those skilled in the art get to know some basic inventive concepts. The appended claims are intended to be construed comprising these preferred embodiments and all the changes and modifications fallen within the scope of the present invention.

It will be apparent to those skilled in the art that various modifications and variations could be made to the present application without departing from the spirit and scope of the present invention. Thus, if any modifications and variations lie within the spirit and principle of the present application, the present invention is intended to include these modifications and variations.

What is claimed is:

1. A device, comprising:
   a laser light source that delivers a laser beam;
   an image sensor;
   an aperture disc comprising at least two stationary pinholes, wherein the laser beam is filtered by the stationary pinholes in a direction from the laser light source to the image sensor to generate a reference wave and an object wave;

a sample having a first area containing an object to be imaged and a second area without any object, wherein the first area is illuminated by the object wave and the second area is illuminated by the reference wave; and wherein the image sensor captures an off-axis hologram for reconstructing an image of the object, wherein the reference wave and the object wave are interfered on the image sensor and the hologram is captured based on an interference pattern of the reference wave and the object wave.

2. The device of claim 1, wherein a distance between the sample and the aperture disc is smaller than a distance between the sample and the image sensor.

3. The device of claim 1, wherein the laser beam is collimated or roughly collimated, illuminates the image sensor perpendicularly, and is focused or roughly focused at a center of the image sensor.

4. The device of claim 1, wherein the laser beam is in a visible spectrum, infrared spectrum or ultraviolet spectrum.

5. The device of claim 1, wherein the laser beam comprises multiple waves of different wavelengths.

6. The device of claim 1, wherein the sample comprises a holder for supporting the object.

7. A system, comprising:
the device of claim 1; and
a processor that receives the captured hologram from the image sensor and reconstructs an image of the object according to the received hologram.

8. The system of claim 7, wherein the reconstructed image is a three-dimensional image of the object or a phase profile of the object.

9. The system of claim 7, wherein the processor reconstructs the image from the hologram and a background hologram obtained without the sample.

10. The system of claim 7, wherein the processor reconstructs the image from the hologram and a background hologram obtained with a sample without the object.

11. A method, comprising:
delivering a laser beam from a laser light source onto an aperture disc comprising at least two stationary pinholes; filtering the beam by the stationary pinholes in a direction from the laser light source to an image sensor to generate an object wave and a reference wave;
leading the object wave to a first area containing an object and leading the reference wave to a second area without any object;
capturing an off-axis hologram based on an interference pattern of the reference wave and the object wave; and
reconstructing an image of the object according to the hologram.

12. The method of claim 11, wherein the laser beam is collimated or roughly collimated, illuminates the image sensor perpendicularly, and is focused or roughly focused at a center of the image sensor.

13. The method of claim 11, wherein the laser beam is in a visible spectrum, infrared spectrum or ultraviolet spectrum.

14. The method of claim 11, wherein the laser beam comprises multiple waves of different wavelengths.

15. The method of claim 11, wherein the reconstructed image is a three-dimensional image of the object or a phase profile of the object.

16. The method of claim 11, wherein the image is reconstructed from the hologram and a background hologram obtained without the sample.

17. The method of claim 11, wherein the image is reconstructed from the hologram and a background hologram obtained with a sample without the object.

* * * * *